United States Patent

(12) United States Patent
Allen

(10) Patent No.: US 10,327,437 B1
(45) Date of Patent: Jun. 25, 2019

(54) ANIMAL ATTRACTANT SYSTEM

(71) Applicant: James Dean Allen, Hudson, FL (US)

(72) Inventor: James Dean Allen, Hudson, FL (US)

(*) Notice: Subject to any disclaimer, the term of this patent is extended or adjusted under 35 U.S.C. 154(b) by 180 days.

(21) Appl. No.: 15/042,706

(22) Filed: Feb. 12, 2016

Related U.S. Application Data

(60) Provisional application No. 62/116,050, filed on Feb. 13, 2015.

(51) Int. Cl.
*A01M 31/06* (2006.01)
*A01M 31/00* (2006.01)

(52) U.S. Cl.
CPC ........ *A01M 31/004* (2013.01); *A01M 31/008* (2013.01); *A01M 31/06* (2013.01)

(58) Field of Classification Search
CPC ................ A01M 31/06; A01M 31/008
USPC ............................................. 43/2, 3
See application file for complete search history.

(56) References Cited

U.S. PATENT DOCUMENTS

| 4,773,178 | A | * | 9/1988 | Marek | A01M 31/06 43/1 |
| 4,937,431 | A | * | 6/1990 | Jameson | A01M 31/008 43/1 |
| 5,029,408 | A | * | 7/1991 | Smith | A01M 31/004 43/1 |
| 5,094,025 | A | * | 3/1992 | Daniels | A01M 31/008 43/1 |
| 5,161,646 | A | * | 11/1992 | Aurich | A01M 31/008 43/1 |
| 5,233,780 | A | * | 8/1993 | Overholt | A01M 31/06 43/2 |
| 5,335,438 | A | * | 8/1994 | Terrill | A01M 31/06 43/1 |
| 5,429,271 | A | * | 7/1995 | Porter | A01M 1/2077 222/146.5 |
| 5,546,692 | A | * | 8/1996 | Byers | A01M 31/06 43/1 |
| 5,555,664 | A | * | 9/1996 | Shockley | A01M 31/008 43/1 |
| 5,618,548 | A | * | 4/1997 | Dawson | A01M 31/008 424/405 |
| 5,744,106 | A | * | 4/1998 | Eagle | A01M 1/2088 239/129 |
| 5,791,081 | A | * | 8/1998 | Turner | A01M 31/06 43/2 |
| 5,826,364 | A | * | 10/1998 | Bitting | A01M 31/06 43/2 |
| 5,884,427 | A | * | 3/1999 | Lenz | A01M 31/06 43/2 |
| 6,021,594 | A | * | 2/2000 | Krueger | A01M 31/06 43/2 |
| 6,038,805 | A | * | 3/2000 | Smidtke | A01M 31/008 126/29 |
| 6,532,693 | B2 | * | 3/2003 | Sides | A01M 31/06 43/2 |
| 6,901,693 | B1 | * | 6/2005 | Crowe | A01M 31/06 43/2 |

(Continued)

*Primary Examiner* — Darren W Ark

(57) ABSTRACT

A housing has a first end and a second end and a chamber there between. At least one animal attractant assembly is within the housing. The animal attractant assembly is chosen from a class consisting of a visual attractant, an audial attractant, and an olfactory attractant. A hand held remote device initiates operation of at least one of the attractant assemblies.

5 Claims, 2 Drawing Sheets

(56) References Cited

U.S. PATENT DOCUMENTS

| | | | | |
|---|---|---|---|---|
| 6,966,500 B1* | 11/2005 | Kelley | ............... | A01M 31/008 239/34 |
| 6,983,103 B1* | 1/2006 | Parcher | ............... | A01M 31/004 222/146.5 |
| 7,389,606 B2* | 6/2008 | McLeod | ............... | A01M 31/06 43/2 |
| 7,549,248 B1* | 6/2009 | Luster | ................... | A01M 31/06 40/412 |
| 7,883,677 B2* | 2/2011 | Palozzi | ............... | A01M 31/008 126/248 |
| 8,739,457 B1* | 6/2014 | Key | ...................... | A01M 31/06 43/2 |
| 9,038,309 B2* | 5/2015 | Forrester | ............... | A01M 31/06 43/2 |
| 9,565,851 B2* | 2/2017 | Peoples | ............... | A01M 31/004 |
| 9,585,981 B2* | 3/2017 | Wynalda, Jr. | ........... | F22B 1/284 |
| 9,717,234 B2* | 8/2017 | Everington | ........... | A01M 31/06 |
| 9,739,796 B2* | 8/2017 | Ferrara, Jr. | ......... | G01P 13/0093 |
| 9,751,660 B2* | 9/2017 | Jasin | ................... | A01M 31/008 |
| 9,848,597 B1* | 12/2017 | Orr | ...................... | A01M 31/004 |
| 2006/0088500 A1* | 4/2006 | Cole | ................... | A01M 31/008 424/84 |
| 2015/0250159 A1* | 9/2015 | Cole | ................... | A01M 31/008 43/2 |

* cited by examiner

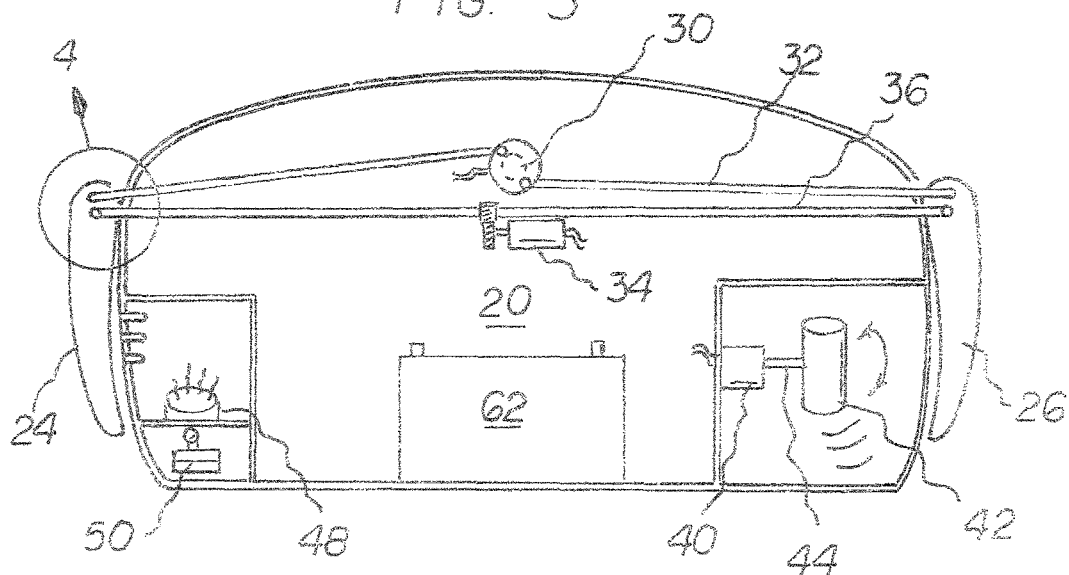
FIG. 3
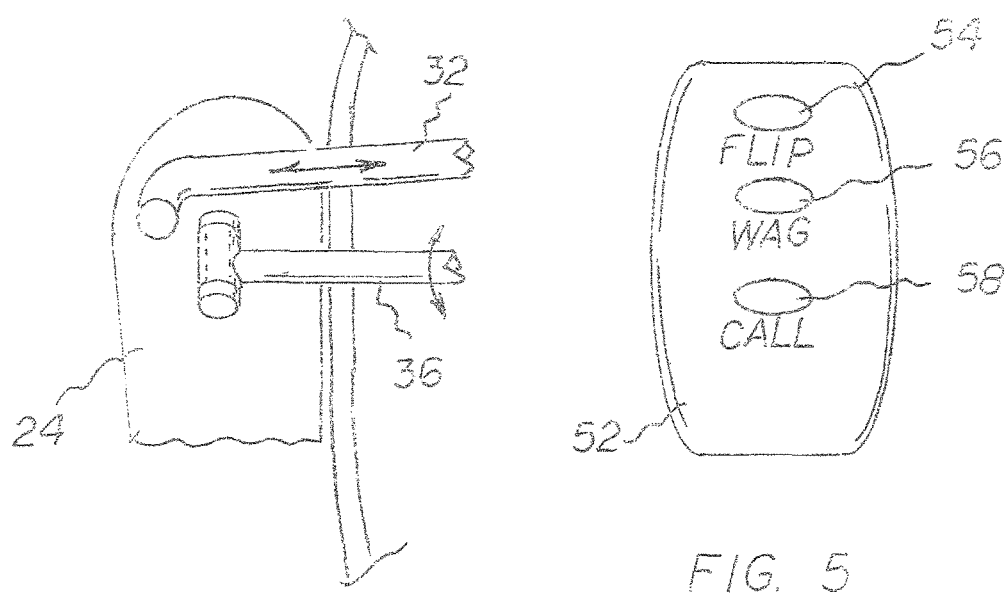
FIG. 4
FIG. 5

ANIMAL ATTRACTANT SYSTEM

RELATED APPLICATION

The present non-provisional patent application is based upon Provisional Patent Application No. 62/116,050 filed Feb. 13, 2015, the subject matter of which is incorporated herein by reference.

BACKGROUND OF THE INVENTION

Field of the Invention

The present invention relates to an animal attractant system and more particularly pertains to initiating operation of at least one of a plurality of attractant assemblies and for attracting a game animal such as a deer to be hunted

Description of the Prior Art

The use of game animal attracting devices of known designs and configurations is known in the prior art. More specifically, game animal attracting devices of known designs and configurations previously devised and utilized for the purpose of attracting animals to be hunted are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe animal attractant system that allows initiating operation of at least one of a plurality of attractant assemblies and for attracting a game animal such as a deer to be hunted. The initiating and attracting are done in a safe, efficient, convenient, and economical manner.

In this respect, the animal attractant system according to the present invention substantially departs from the conventional concepts and designs of the prior art, and in doing so provides an apparatus primarily developed for the purpose of initiating operation of at least one of a plurality of attractant assemblies and for attracting a game animal such as a deer to be hunted. The initiating and attracting are done in a safe, efficient, convenient, and economical manner.

Therefore, it can be appreciated that there exists a continuing need for a new and improved animal attractant system which can be used for initiating operation of at least one of a plurality of attractant assemblies and for attracting a game animal such as a deer to be hunted In this regard, the present invention substantially fulfills this need.

SUMMARY OF THE INVENTION

In view of the foregoing disadvantages inherent in the known types of game animal attracting devices of known designs and configurations now present in the prior art, the present invention provides an improved animal attractant system. As such, the general purpose of the present invention, which will be described subsequently in greater detail, is to provide a new and improved animal attractant system and method which has all the advantages of the prior art and none of the disadvantages.

To attain this, from a broad perspective, the present invention essentially comprises an animal attractant system including a housing having a first end, a second end, and a chamber there between. At least one animal attractant assembly is within the housing. The animal attractant assembly is chosen from a class consisting of a visual attractant, an audial attractant, and an olfactory attractant. A hand held remote device initiates operation of at least one of the attractant assemblies.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal attractant system which has all of the advantages of the prior art game animal attracting devices of known designs and configurations and none of the disadvantages.

It is another object of the present invention to provide a new and improved animal attractant system which may be easily and efficiently manufactured and marketed.

It is a further object of the present invention to provide a new and improved animal attractant system which is of durable and reliable constructions.

An even further object of the present invention is to provide a new and improved animal attractant system which is susceptible of a low cost of manufacture with regard to both materials and labor, and which accordingly is then susceptible of low prices of sale to the consuming public, thereby making such animal attractant system economically available to the buying public.

Lastly, it is an object of the present invention to provide an animal attractant system for initiating operation of at least one of a plurality of attractant assemblies and for attracting a game animal such as a deer to be hunted.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3-3 of FIG. 2.

FIG. 4 is an enlarges showing of the components taken at circle 4 of FIG. 3.

FIG. 5 is a plan view of a remote device taken it line 5-5 of FIG. 4.

The same reference numerals refer to the same parts throughout the various Figures.

DESCRIPTION OF THE PREFERRED EMBODIMENT

Figure 1:
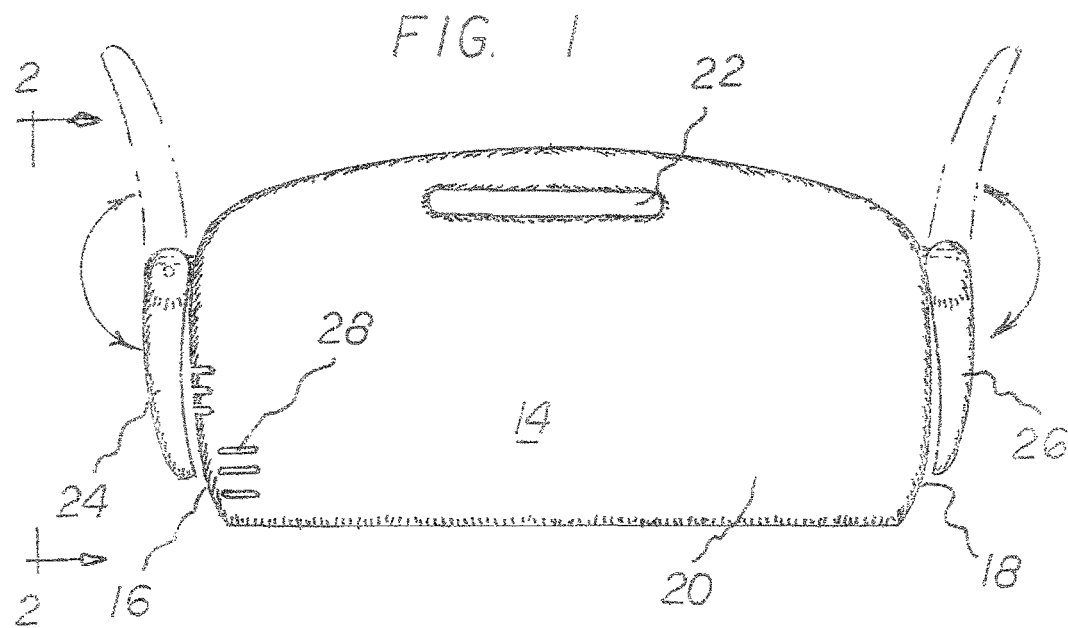
FIG. 1 is a front elevational view of an animal attractant system constructed in accordance with the principles of the present invention.
Figure 2:
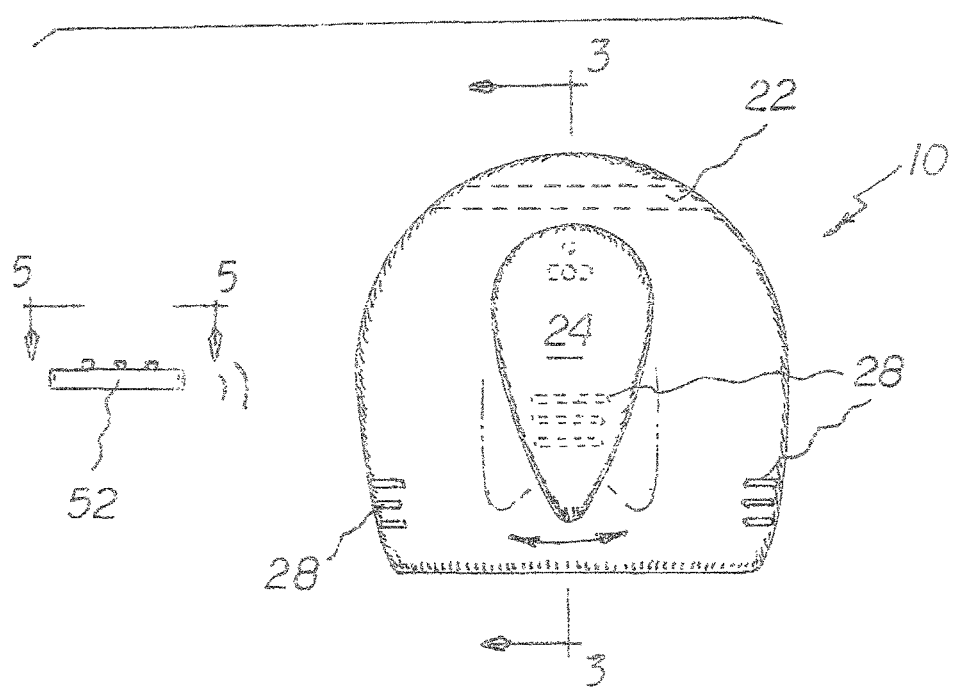
FIG. 2 is a side elevational view of the system of FIG. 1 but with the hand held remote device included.

With reference now to the drawings, and in particular to FIG. 1 thereof, the preferred embodiment of the new and improved animal attractant system embodying the principles and concepts of the present invention and generally designated by the reference numeral 10 will be described.

The present invention, the animal attractant system 10 is comprised of a plurality of components. Such components in their broadest context include a housing and at least one animal attractant assembly. Such components are individually configured and correlated with respect to each other so as to attain the desired objective.

The present invention, an animal attractant system 10 functions for initiating operation of at least one of a plurality of attractant assemblies and for attracting a game animal such as a deer to be hunted. The attracting being done in response to the initiating. The initiating and the attracting being done in a safe, efficient, convenient, and economical manner. The system, from a specific perspective, comprises a housing 14 having a first end 16 and a second end 18 and a chamber 20 between the first end and the second end. A passageway 22 extends through the housing for a user's hand to facilitate repositioning of the system. A first tail 24 is coupled to the first end of the housing. A second tail 26 is coupled to the second end of the housing. A plurality of ports 28 are formed through the housing adjacent to the first end.

The plurality of attractant assemblies also includes a visual attractant, a sight of interest to the animal being hunted. The visual attractant has a primary motor 30 with reciprocable linkages 32 within the housing. The reciproable linkages couple the primary motor to both tails to reciprocate both tails and cause a raising and lowering of both tails. The visual attractant has a secondary motor 34 with rotary linkages 36. The rotary linkages couple the secondary motor to both tails to cause a lateral reciprocation of both tails.

Next, the plurality of attractant assemblies includes an audial attractant within the housing. The audial attractant has a tertiary motor 40 and a container 42 with objects which when moved generate sounds of interest to an animal being hunted. A rotary linkage 44 coupling the tertiary motor to the container to cause sounds of interest to the animal being hunted.

Lastly, the plurality of attractant assemblies includes an olfactory attractant within the housing. The olfactory attractant has a battery powered, scented tealight candle 48 with batteries 50 to generate an aroma of interest to an animal being hunted. The battery powered, scented tealight candle is located adjacent to the ports for disseminating the aroma of interest to the animal being hunted.

A hand held remote device 52 is a part of the system. The hand held remote device has a first button 54 operatively coupled to the primary motor to flip both tails in a raise and lower movement. The hand held remote device has a second button 56 operatively coupled to the secondary motor to wag both tails in a laterally reciprocable movement. The hand held remote device has a third button 58 operatively coupled to the tertiary motor to generate the sound of interest to the animal being hunted. A battery 62 is within the housing powering the primary motor, the secondary motor, and the tertiary motor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal attractant system (10) for initiating operation of at least one of a plurality of attractant assemblies and for attracting a game animal such as a deer to be hunted, attracting being done in response to initiating, the initiating and the attracting being done in a safe, efficient, convenient, and economical manner, the system comprising, in combination:

a housing (14) having a first end (16) and a second end (18) and a chamber (20) between the first end and the second end, a passageway (22) extending through the housing for a user's hand to facilitate repositioning of the system, a first tail (24) coupled to the first end of the housing, a second tail (26) coupled to the second end of the housing, a plurality of ports (28) formed through the housing adjacent to the first end;

the plurality of attractant assemblies including a visual attractant, the visual attractant having a primary motor (30) with reciprocable linkages (32) within the housing, the reciprocable linkages coupling the primary motor to reciprocate both of said tails to flip both of said tails in a raise and lower movement; and a hand held remote device (52) having a first button (54) operatively coupled to the primary motor to initiate the reciprocation of both tails to flip both of said tails in the raise and lower movement.

2. The system as set forth in claim 1 wherein
the visual attractant has a secondary motor (34) with rotary linkages (36), the rotary linkages coupling the secondary motor to both of said tails to reciprocate both of said tails to wag both of said tails in a laterally reciprocable movement; and
the hand held remote device (52) has a second button (56) operatively coupled to the secondary motor to initiate the reciprocation of both of said tails to wag both of said tails in the laterally reciprocable movement.

3. The system as set forth in claim 1 wherein:

the plurality of attractant assemblies including an audial attractant within the housing, the audial attractant having a tertiary motor (40) and a container (42) with objects which when moved generate sounds of interest to the animal being hunted, a rotary linkage (44) coupling the tertiary motor to the container to cause sounds of interest to the animal being hunted; and the hand held remote device (52) has a third button (58) operatively coupled to the tertiary motor to generate the sound of interest to the animal being hunted.

4. The system as set forth in claim 1 wherein the plurality of attractant assemblies include an olfactory attractant having a battery powered scented tealight candle (48) with batteries (50) to generate an aroma of interest to the animal being hunted, the battery powered scented tealight candle being located adjacent to the ports for disseminating the aroma of interest to the animal being hunted.

5. An animal attractant system (10) for initiating operation of at least one of a plurality of attractant assemblies and for attracting a game animal such as a deer to be hunted, the attracting being done in response to the initiating, the initiating and the attracting being done in a safe, efficient, convenient, and economical manner, the system comprising, in combination:

a housing (14) having a first end (16) and a second end (18) and a chamber (20) between the first end and the second end, a passageway (22) extending through the housing for a user's hand to facilitate repositioning of the system, a first tail (24) coupled to the first end of the housing, a second tail (26) coupled to the second end of the housing, a plurality of ports (28) formed through the housing adjacent to the first end;

the plurality of attractant assemblies including a visual attractant, the visual attractant having a primary motor (30) with reciprocable linkages (32) within the housing, the reciprocable linkages coupling the primary motor to reciprocate both of said tails to flip both of said tails in a raise and lower movement, the visual attractant having a secondary motor (34) with rotary linkages (36), the rotary linkages coupling the secondary motor to both tails to reciprocate both of said tails to wag both of said tails in a laterally reciprocable movement;

the plurality of attractant assemblies including an audial attractant within the housing, the audial attractant having a tertiary motor (40) and a container (42) with objects which when moved generate sounds of interest to the animal being hunted, a rotary linkage (44) coupling the tertiary motor to the container to cause sounds of interest to the animal being hunted;

the plurality of attractant assemblies including an olfactory attractant within the housing, the olfactory attractant having a battery powered scented tealight candle (48) with batteries (50) to generate an aroma of interest to the animal being hunted, the battery powered scented tealight candle being located adjacent to the ports for disseminating the aroma of interest to the animal being hunted; and a hand held remote device (52) having a first button (54) operatively coupled to the primary motor to initiate the reciprocation of both of said tails to flip both of said tails in the raise and lower movement, a second button (56) operatively coupled to the secondary motor to initiate the reciprocation of both of said tails to wag both of said tails in the laterally reciprocable movement, and a third button (58) operatively coupled to the tertiary motor to generate the sound of interest to the animal being hunted, a battery (62) within the housing powering the primary motor and the secondary motor and the tertiary motor.

\* \* \* \* \*